US011319870B1

(12) United States Patent
Ezra

(10) Patent No.: US 11,319,870 B1
(45) Date of Patent: May 3, 2022

(54) TURBOCHARGER CONTROL VALVE FOR RETAINING BACK PRESSURE AND MAINTAINING BOOST PRESSURE

(71) Applicant: Eyal Ezra, Upper Montclair, NJ (US)

(72) Inventor: Eyal Ezra, Upper Montclair, NJ (US)

( * ) Notice: Subject to any disclaimer, the term of this patent is extended or adjusted under 35 U.S.C. 154(b) by 0 days.

(21) Appl. No.: 17/228,906

(22) Filed: Apr. 13, 2021

(51) Int. Cl.
*F02B 37/24* (2006.01)
*F02D 41/00* (2006.01)

(52) U.S. Cl.
CPC .......... *F02B 37/24* (2013.01); *F02D 41/0007* (2013.01); *F05D 2220/40* (2013.01); *F05D 2240/12* (2013.01); *F05D 2270/304* (2013.01); *F05D 2270/3013* (2013.01); *F05D 2270/44* (2013.01)

(58) Field of Classification Search
CPC .. F02B 37/24; F02D 41/0007; F05D 2220/40; F05D 2240/12; F05D 2270/3013; F05D 2270/304; F05D 2270/44
See application file for complete search history.

(56) References Cited

U.S. PATENT DOCUMENTS

| 4,322,949 A | 4/1982 | Byrne et al. |
| 4,702,070 A | 10/1987 | Cureton et al. |
| 4,896,568 A | 1/1990 | Gierer |
| 5,375,419 A | 12/1994 | Wright et al. |
| 6,269,642 B1 | 8/2001 | Arnold et al. |
| 6,418,719 B2 | 7/2002 | Terry et al. |
| 8,109,090 B2 | 2/2012 | Nishiyama et al. |
| 9,429,033 B2 * | 8/2016 | Martin ...................... F01D 9/04 |
| 2011/0113775 A1 | 5/2011 | Lilly |
| 2013/0223978 A1* | 8/2013 | Kitzmiller ............. F03B 11/004 415/151 |
| 2014/0086726 A1* | 3/2014 | Isogai ................. F04D 29/4206 415/73 |
| 2014/0161595 A1* | 6/2014 | Tashiro ................... F02B 37/24 415/146 |

* cited by examiner

*Primary Examiner* — Audrey B. Walter
*Assistant Examiner* — Dapinder Singh
(74) *Attorney, Agent, or Firm* — Goldstein Law Offices, P.C.

(57) ABSTRACT

A turbocharger control valve having an extended feedback cap for altering the performance of a variable geometry turbocharger delivering boost pressure to an engine, the extended feedback cap has an increased cap length which displaces a spool within the turbocharger control valve to alter hydraulic fluid flow through the turbocharger control valve, causing the turbocharger to delay opening a variable inlet to release exhaust pressure, also causing the turbocharger to preemptively close the variable inlet to mitigate loss of exhaust back pressure and boost pressure without a command from a turbocharger control module.

9 Claims, 12 Drawing Sheets

TURBOCHARGER CONTROL VALVE FOR RETAINING BACK PRESSURE AND MAINTAINING BOOST PRESSURE

TECHNICAL FIELD

The present disclosure relates generally to a turbocharger control valve. More particularly, the present disclosure relates to an improved control valve which improves turbocharger performance with minimal modification.

BACKGROUND

A turbocharger improves the efficiency of an internal combustion engine by harnessing the exhaust gas produced by the engine to power a turbine, which in turn rotates a compressor to deliver compressed air to the engine to increase the power and efficiency of the engine. Conventional turbochargers have turbines with fixed sizes and their performance characteristics are limited as a result. Large turbines are capable of producing large amounts of boost pressure, but are subject to longer "spool up" times as the volume of exhaust gas produced by the engine at low engine speeds is initially insufficient to turn the turbine wheel, requiring a steady buildup of exhaust gas pressure until the turbocharger can generate boost pressure. Turbochargers with small turbines are capable of generating boost pressure at low engine speeds using small volumes of exhaust gas, but deliver poor performance at high engine speeds because the smaller turbines cannot match the ability of large turbines to harness the large volumes of exhaust gas needed to drive the compressor to produce high boost pressure.

Variable geometry turbochargers represent a significant improvement over conventional turbochargers, and are equipped with movable vanes or other structures which modify the flow of exhaust gas into the turbine. For example, the vanes pivot at low engine speeds to force the exhaust gas through a narrow inlet, and the resulting high-velocity stream of gas turns the turbine wheel. When the engine operates at high engine speeds and the exhaust gas pressure rises, the vanes pivot to increase the size of the inlet, allowing a larger volume of exhaust gas to enter the turbine to allow the turbocharger to produce more boost pressure. Variable geometry turbochargers are responsive at low engine speeds yet also capable of delivering high boost pressure at high engine speeds. The movement of the vanes is achieved using a hydraulic actuation apparatus which will cause the vanes to open or close automatically in response to different engine speeds and engine loads. Typically, the vanes will be closed when the engine operates at low speeds to generate more boost pressure with a low volume of exhaust gas. As the engine speed increases along with the volume of exhaust gas, the vanes will open to prevent an excess buildup of exhaust pressure. Upon achieving an optimal amount of boost pressure, the vanes will remain fixed in position.

However, in certain situations, the opening of the vanes will instead cause an undesirable drop in boost pressure if the vanes open too quickly. Furthermore, after optimal boost pressure is achieved and the vanes are fixed, a reduction in engine speed and exhaust gas volume will cause a drop in exhaust back pressure along with an unwanted drop in boost pressure. Engine performance will therefore be reduced until the turbocharger control system eventually closes the vanes to compensate for the reduced volume of exhaust gas.

Vehicles engaged in off-roading or towing operations require sustained boost pressure at low vehicular speeds, with intervals of high engine operating speed followed by frequent reductions in engine speed, thus presenting an application for which the default characteristics of the turbocharger are poorly optimized. The default characteristics can be improved upon by delaying widening of the inlet between the vanes to enable the turbocharger to deliver sustained boost pressure at low engine and vehicular speeds, while also mitigating loss of back pressure and boost pressure caused by sudden drops in engine speed following intervals of high engine speed operation.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a turbocharger control valve which improves turbocharger performance by maintaining exhaust pressure. The turbocharger harnesses exhaust gas from the engine to increase boost pressure to the engine using a compressor. The compressor is powered by a turbine assembly having a turbine wheel, a variable geometry assembly with a variable inlet adapted to move between a closed position and an open position, and a hydraulic actuation assembly having a piston which actuates the variable geometry assembly to move the variable inlet between the closed and open positions. The variable inlet closes to increase the velocity of the exhaust gas flowing through the turbine assembly to rotate the turbine wheel, allowing the turbocharger to deliver greater boost pressure at low engine speeds, and opens as exhaust gas pressure increases at high engine speeds, potentially causing a premature decrease in boost pressure if engine speed decreases while the variable inlet is opening. The actuator piston is controlled by a conventional turbocharger control valve. Accordingly, the present disclosure provides a turbocharger control valve with an extended feedback cap which has a greater cap length than stock feedback cap. The greater cap length of the extended feedback cap increases displacement of a spool within the turbocharger control valve to alter the flow of hydraulic fluid which actuates the actuator piston, delaying the opening of the variable inlet to maintain greater exhaust gas pressure. The extended feedback cap also causes the actuator piston to retract and close the variable inlet when the stock feedback cap would cause the actuator piston to be fixed in position, thereby preemptively mitigating a loss in boost pressure following a reduction in the pressure of the exhaust gas.

It is another aspect of an example embodiment in the present disclosure to provide a turbocharger control valve which modifies turbocharger performance without extensive modification or reprogramming of control units. Accordingly, the extended feedback cap is adapted to replace the stock feedback cap in a conventional turbocharger control valve. Furthermore the extended feedback cap creates increased displacement of the spool by offsetting an advancing force exerted against the spool by a valve actuator, whereby the valve actuator remains calibrated for use with the stock feedback cap, resulting in a net force which pushes the spool further away from the extended feedback cap.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
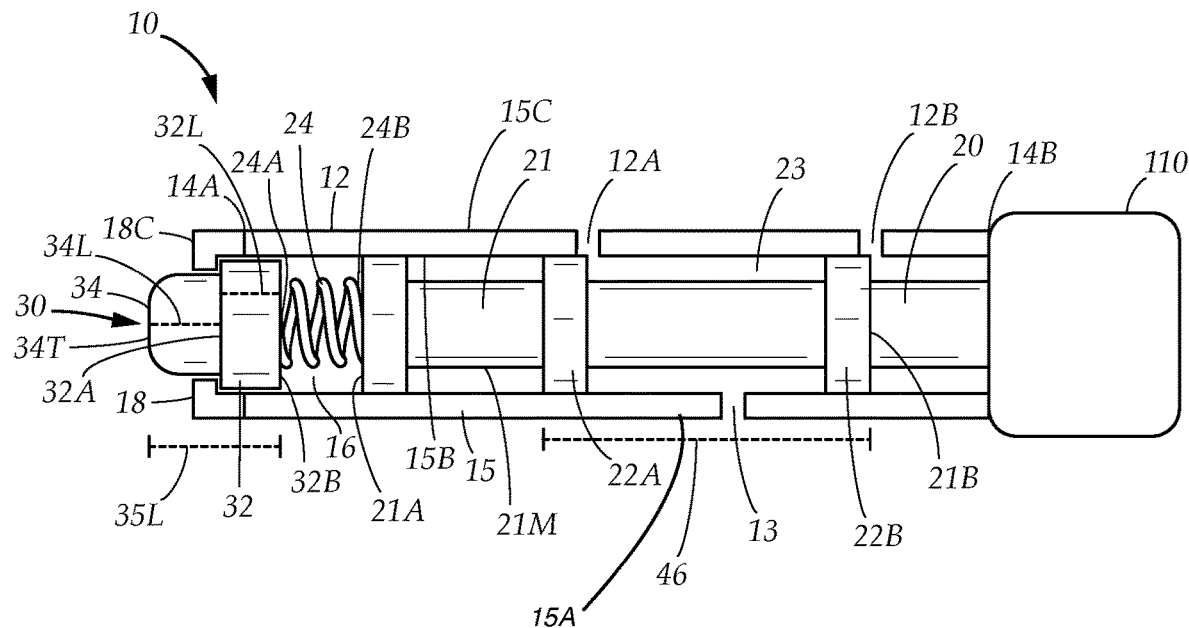
FIG. 1A is a sectional view of a turbocharger control valve with an extended feedback cap, a valve sleeve, a spool which advances or retracts within the valve sleeve, and a valve actuator, in accordance with an embodiment in the present disclosure.
Figure 2A:
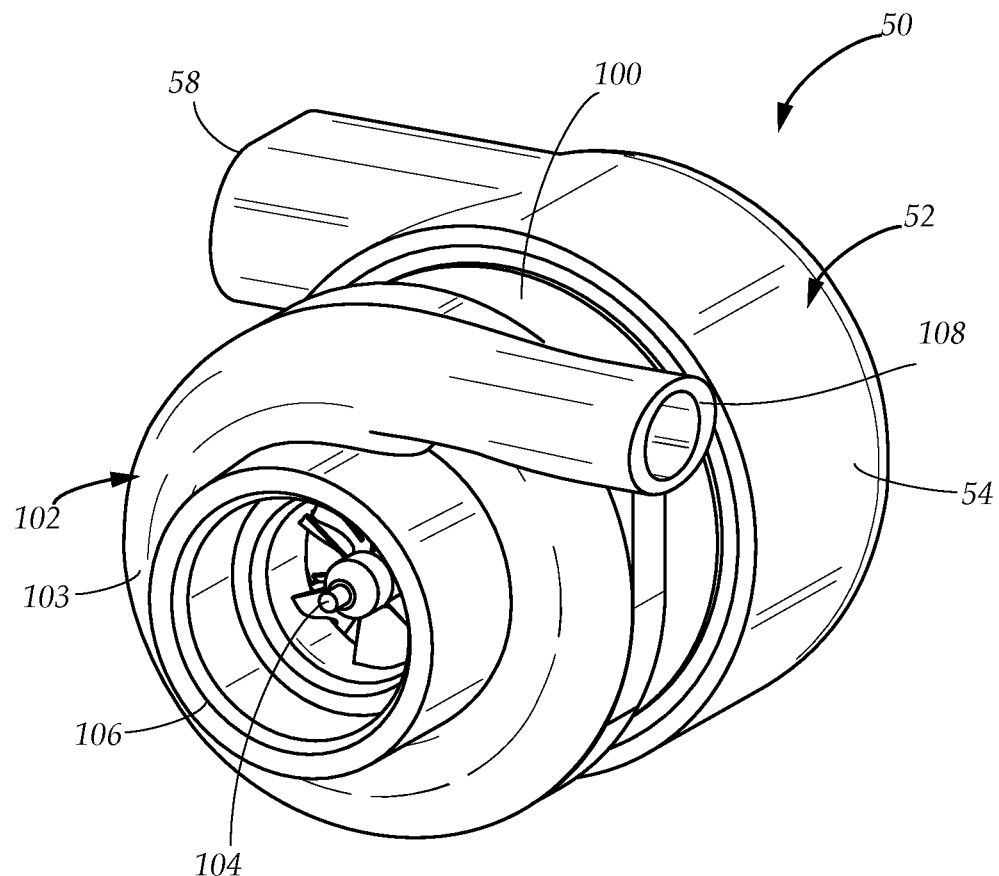
FIG. 2A is a diagrammatical perspective view of a turbocharger showing the exterior of a compressor assembly, in accordance with an embodiment in the present disclosure.
Figure 2B:
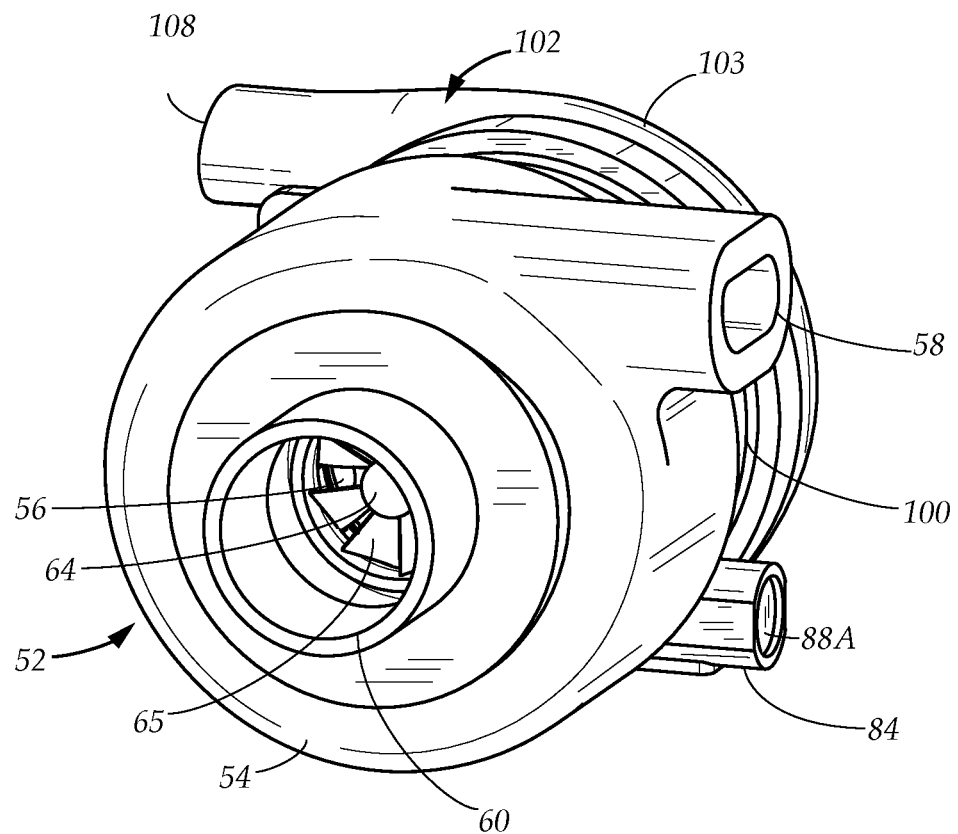
FIG. 2B is a diagrammatical perspective view of the turbocharger showing the exterior of a turbine assembly, in accordance with an embodiment in the present disclosure.

FIG. 1A illustrates a turbocharger control valve 10 for controlling a variable geometry turbocharger 50 as shown in FIGS. 2A-B. The turbocharger 50 is adapted for use with an internal combustion engine for powering vehicles such as cars or trucks, and increases the performance of the engine by harnessing exhaust gas to increase the engine's power output.

Figure 1B:
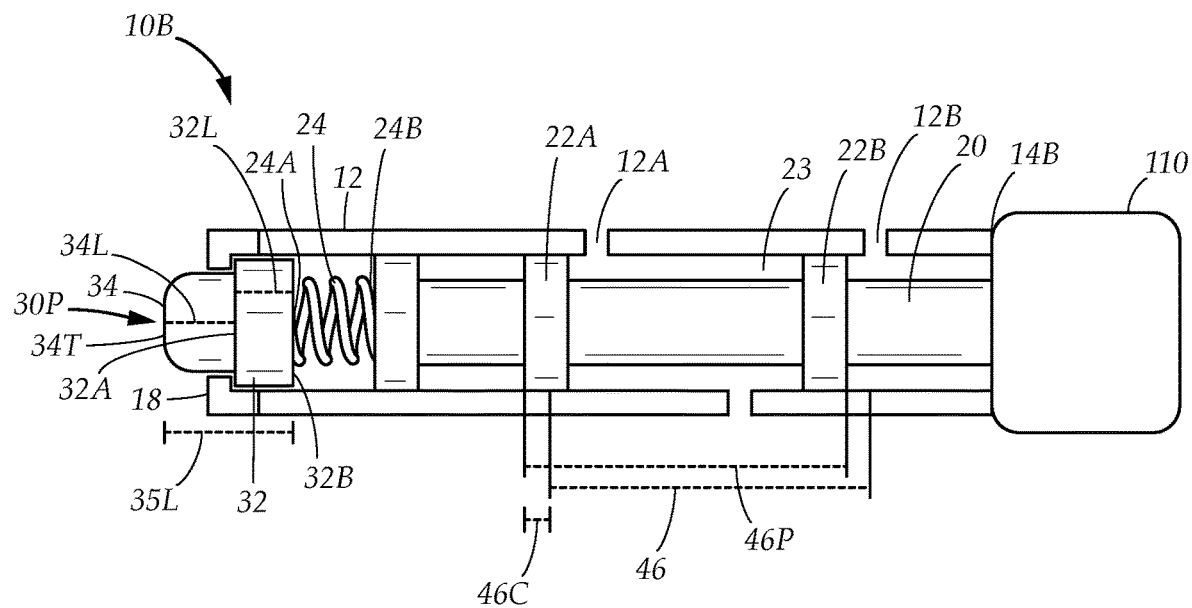
FIG. 1B is a sectional view of a turbocharger control valve with a stock feedback cap, in accordance with an embodiment in the present disclosure.

Referring to FIGS. 2A-B, the exemplary variable geometry turbocharger 50 depicted is known in the art and comprises a turbine assembly 52, a compressor assembly 102, and a central housing 100 which joins the compressor and turbine assemblies 102, 52. The turbocharger 50 is adapted to improve the efficiency and power of an internal combustion engine having one or more combustion chambers, an air intake to draw air into the combustion chambers, and an exhaust port to allow exhaust gas to exit, by harnessing the exhaust gas using the turbine assembly 52, which in turn drives the compressor assembly 102, causing the compressor to increase boost pressure by forcing compressed air into the combustion chamber via the air intake. Referring to FIGS. 1A-B and FIG. 2A, in contrast to a conventional turbocharger control valve 10B with a stock feedback cap 30P, the turbocharger control valve 10 has an extended feedback cap 30 which alters the operation of the turbocharger 50, resulting in increased retention of exhaust back pressure while preventing an undesired drop in boost pressure which would occur when the stock feedback cap 30P is used. The extended feedback cap 30 may be provided as an upgrade kit, allowing a user to modify a conventional turbocharger control valve 10B. Alternatively, the turbocharger control valve 10 may be provided as a preassembled component for installation within the turbocharger 50.

Figure 3A:
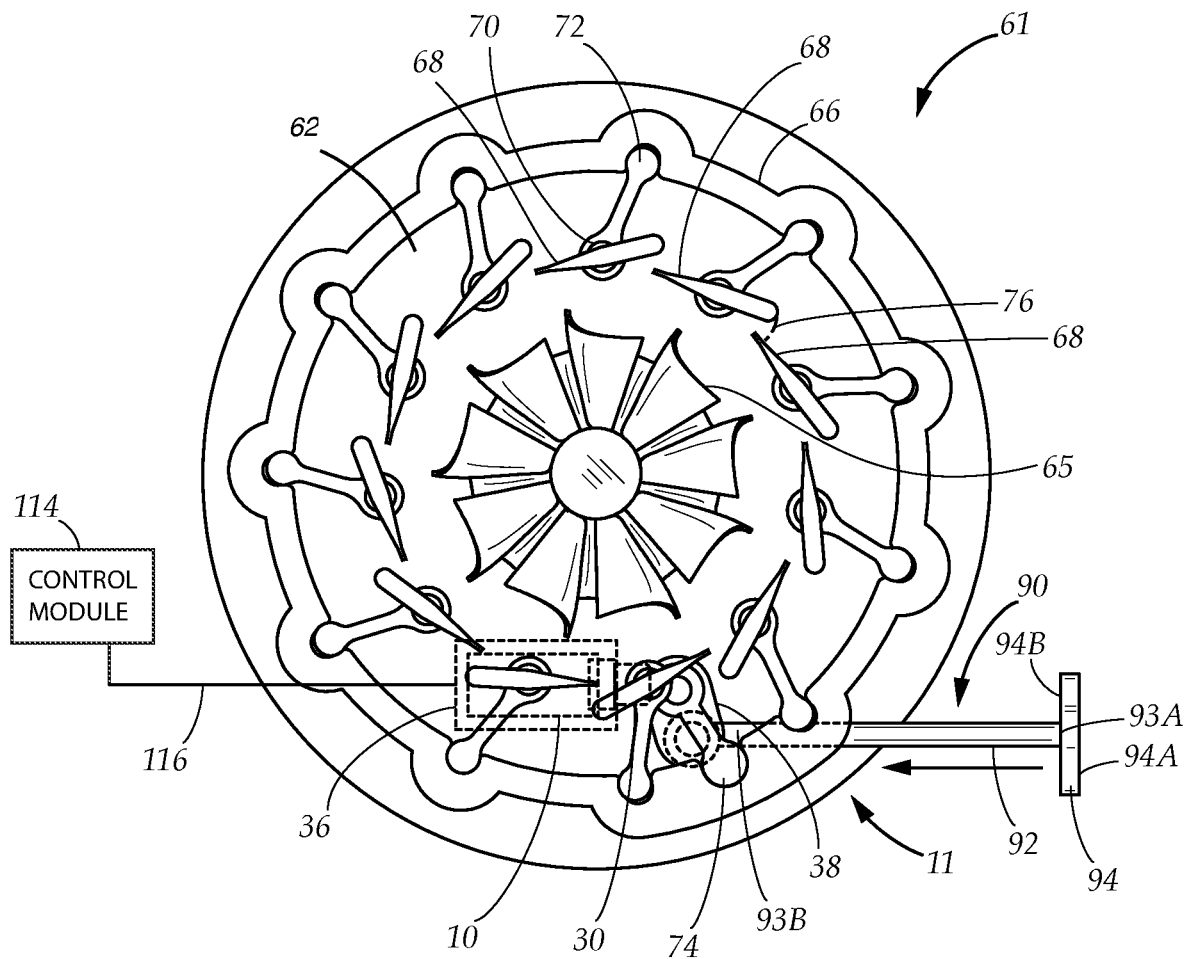
FIG. 3A is a diagrammatical side view of a variable geometry assembly having adjustable vanes with variable inlets in closed positions, an actuator piston and the turbocharger control valve which controls the actuator piston, and a cam which provides mechanical feedback to the turbocharger control valve, in accordance with an embodiment in the present disclosure.

Referring to FIG. 3A, and FIGS. 2A-B simultaneously, the turbocharger 50 has a variable geometry assembly 61 which alters the flow of the exhaust gas through the turbine assembly 52, allowing the turbocharger 50 to increase boost pressure at low engine speeds as well as limit the boost pressure at high engine speeds. The turbine assembly 52 has a turbine housing cover 54 which encloses an exhaust chamber 56 and a turbine wheel 64 therein. The turbine wheel 64 has a plurality of blades 65. The turbine assembly 52 also has an exhaust inlet 58 which allows exhaust gas produced by the engine to enter into the exhaust chamber 56, and an exhaust outlet 60 which allows the exhaust gas to exit the exhaust chamber 56. The movement of the exhaust gas through the exhaust chamber 56 pushes against the blades 65 and causes the turbine wheel 64 to rotate. The back pressure corresponds to pressure exerted by the exhaust gas within the exhaust chamber 56. The amount of back pressure may be proportional to the volume of the exhaust gas flowing into the exhaust chamber 56 in relation to the volume of the exhaust chamber. The compressor assembly 102 has a compressor housing 103 containing a compressor chamber and a compressor wheel 104 therein. The compressor assembly 102 further has an air inlet 106 which allows air to flow into the compressor chamber, and an air outlet which allows air to exit the compressor chamber. The turbine wheel 64 is linked to the compressor wheel 104 via the central housing 100, and the motion of the turbine wheel 64 causes the compressor wheel to rotate, drawing air into the compressor chamber via the air inlet 106 and forcing compressed air through the air outlet 108.

The variable geometry assembly 61 is housed within the turbine assembly 52, and is adapted to control the flow of the exhaust gas contacting the blades 65 of the turbine wheel 64. The variable geometry assembly 61 may comprise a plurality of vanes 68 arranged in a ring pattern surrounding the turbine wheel 64. Each vane 68 may be mounted to a turbine plate 62 via a pin 70, allowing the vane 68 to pivot around the pin 70. The distance between neighboring vanes 68 forms a variable inlet 76 through which the exhaust gas flows to contact the blades 65 of the turbine wheel 64. By pivoting each vane 68 around its pin 70, the distance between each pair of neighboring vanes 68 can be adjusted to selectively increase or decrease the area of each variable inlet 76. Each vane 68 may pivot between a fully open position where the area of each variable inlet 76 is at its greatest, and a fully closed position where the area of each variable inlet 76 is at its minimum.

Referring to FIGS. 2A-B and FIGS. 3A-B, reducing the area of the variable inlet 76 increases the pressure and velocity of the exhaust gas flowing through the variable inlet 76 to contact the blades 65 of the turbine wheel 64, allowing the turbocharger 50 to achieve greater boost pressure when the engine is operating at low speeds, where the exhaust gas produced by the engine would otherwise generate insufficient exhaust gas pressure to drive the turbine wheel 64 and compressor wheel 104 and allow the turbocharger 50 to generate sufficient boost pressure. As the exhaust gas pressure increases, the vanes 68 will gradually pivot towards the open position to reduce exhaust back pressure resulting from an increasing volume of gas being forced through the variable inlet 76 when the area of the variable inlet 76 is small. As the exhaust gas pressure decreases, the vanes 68 may pivot back towards the closed position.

Figure 3B:
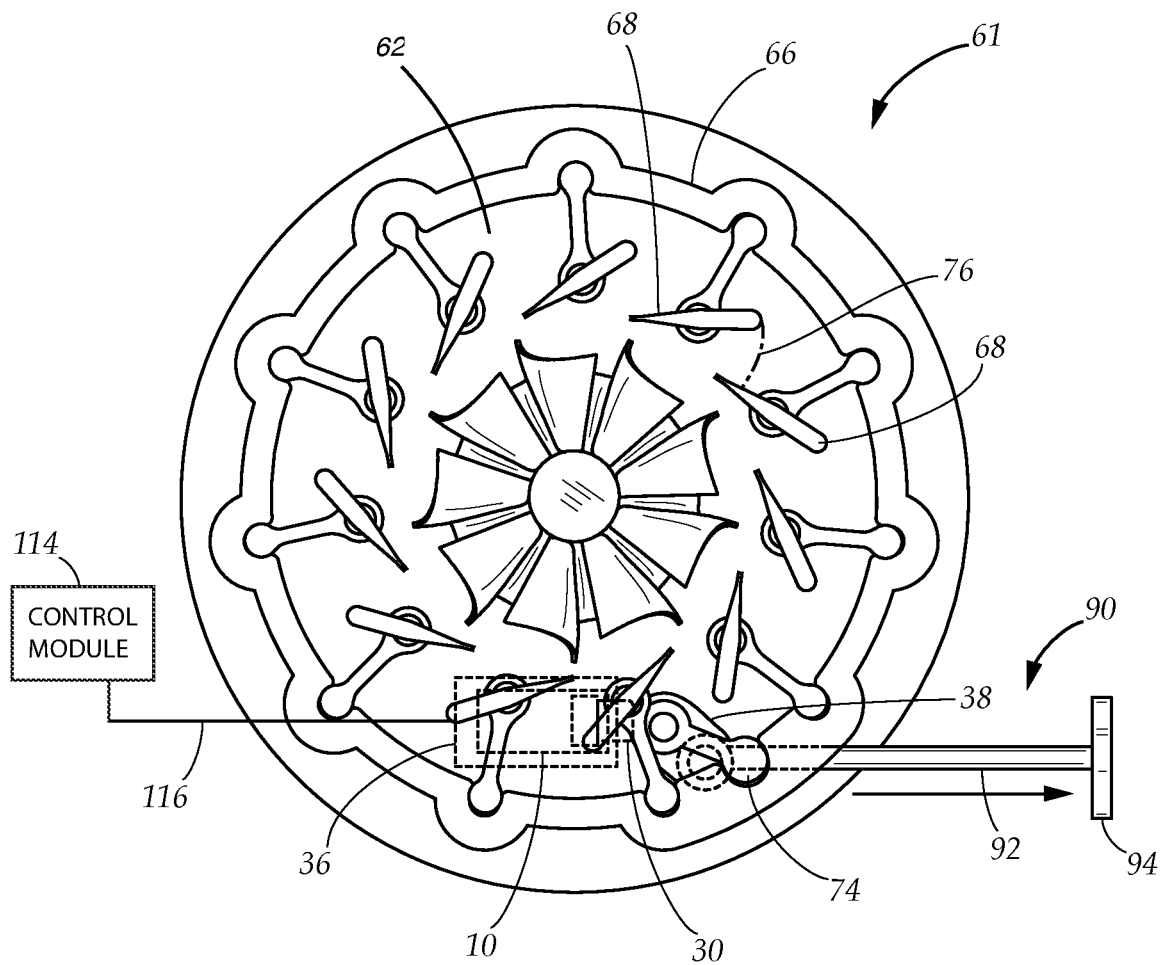
FIG. 3B is a diagrammatical side view of the variable geometry assembly, showing the variable inlets in open positions, in accordance with an embodiment in the present disclosure.
Figure 4:
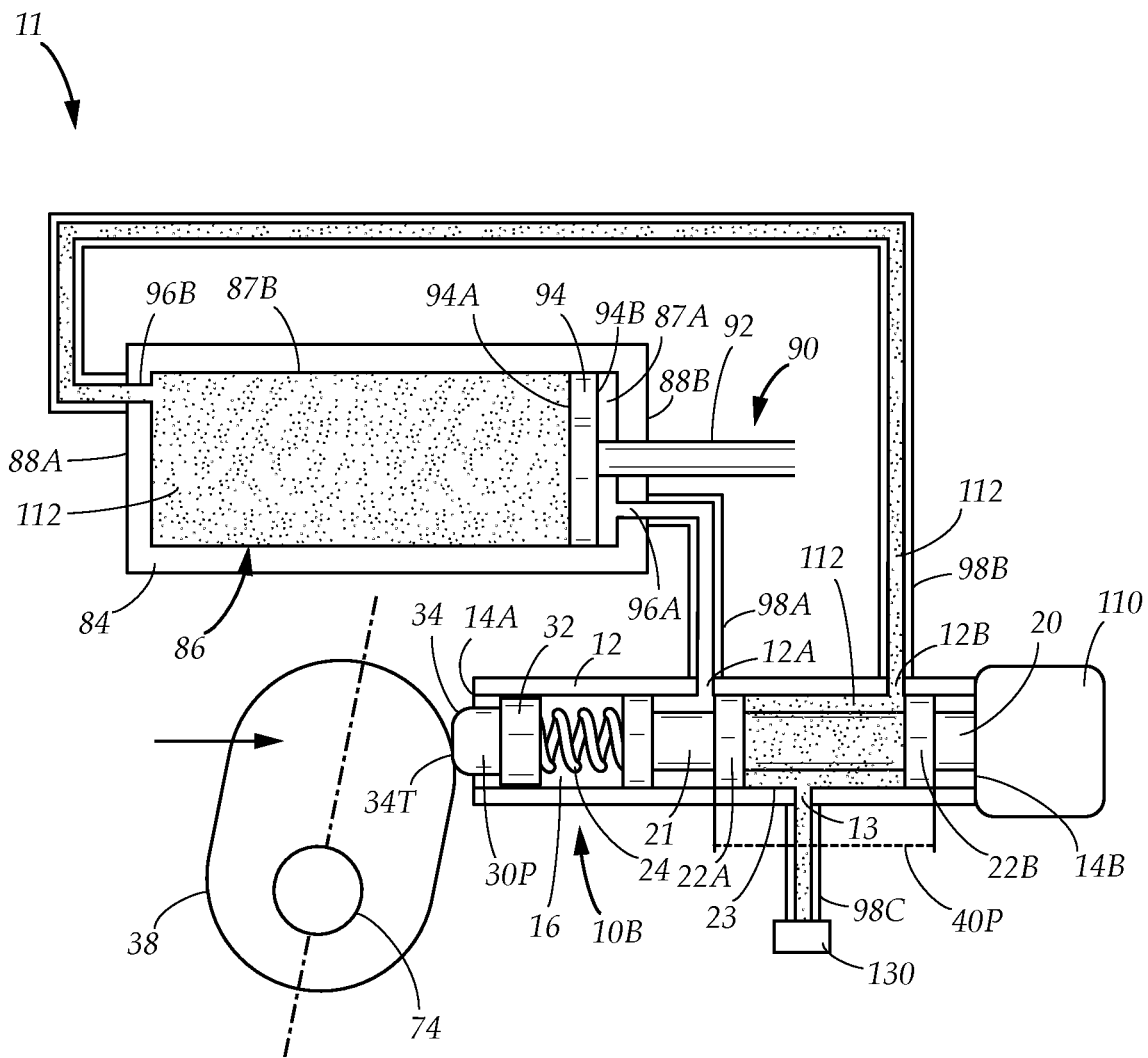
FIG. 4 is a diagrammatical side view of a hydraulic actuation assembly which is controlled by a conventional turbocharger control valve to hydraulically advance or retract the actuator piston, further showing the spool in a stock fully retracted position which hydraulically retracts the piston, in accordance with an embodiment in the present disclosure.
Figure 6:
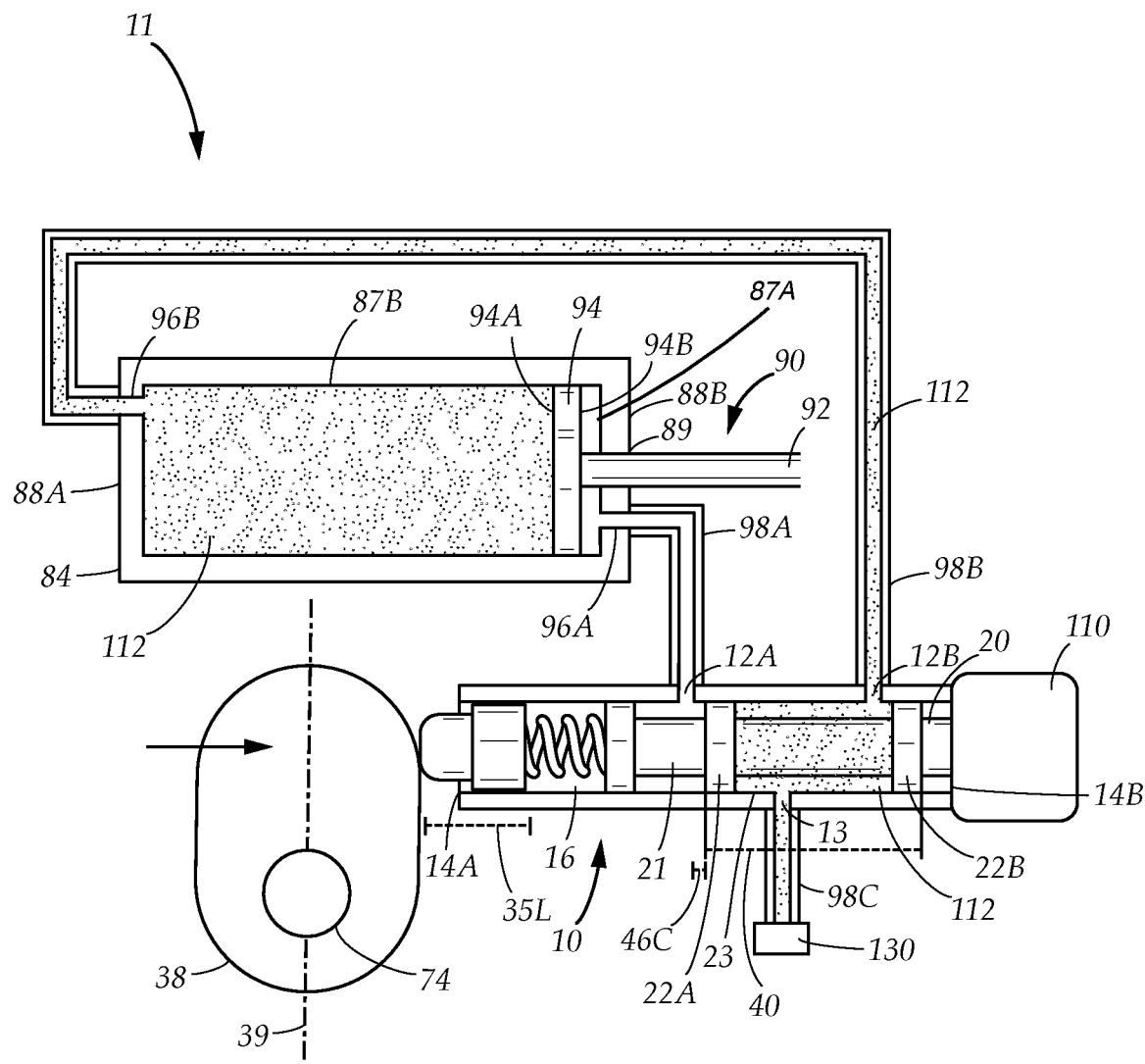
FIG. 6 is a diagrammatical side view of the hydraulic actuation assembly controlled by the turbocharger control valve with the extended feedback cap, further showing the spool in a fully retracted position, in accordance with an embodiment in the present disclosure.

Turning to FIG. 4 and FIG. 6 while also referring to FIGS. 2A-B, and FIGS. 3A-B, the turbocharger 50 further has a hydraulic actuation assembly 11 which controls and actuates the variable geometry assembly 61. The hydraulic actuation assembly 11 comprises a piston housing 84, an actuator piston 90 disposed within the piston housing 84, a first hydraulic transport line 98A and a second transport line 98B adapted to carry a hydraulic fluid 112 for hydraulically powering the actuator piston 90, an actuator lever 74 which links the actuator piston 90 to the variable geometry assembly 61, and a hydraulic fluid source 130. The piston housing 84 is a substantially cylindrical tube comprising a housing outer end 88A, a distally oriented housing inner end 88B, and a housing interior 86 extending therebetween.

The actuator piston 90 comprises a piston head 94 with a piston head outer face 94A and a piston head inner face 94B, and an actuator rod 92 which extends from the piston head inner face 94B. The actuator piston 90 is positioned axially within the housing interior 86 with the piston head outer face 94A oriented towards the housing outer end 88A and the piston head inner face 94B oriented towards the housing inner end 88B. The actuator rod 92 has an actuator rod first end 93A which is joined to the piston head inner face 94B, and an actuator rod second end 93B which extends away from the piston head 94 and passes through the piston housing via an actuator rod opening 89 at the housing inner end 88B. The actuator rod 92 is operably connected to the variable geometry assembly 61 via the actuator lever 74, and is adapted to control the movement thereof. In one embodiment, the variable geometry assembly 61 may further have a unison ring 66 and a plurality of vane levers 72 which are connected to the actuator rod 92 via the actuator lever 74. The reciprocating motion of the actuator rod 92 causes the unison ring 66 to turn about the turbine plate 62, causing the vane levers 72 to alternately pivot the vanes 68 between the closed position and the open position.

The piston head 94 extends across the housing interior 86 in a transverse manner and divides the housing interior 86 between an inner cavity 87A defined between the piston head inner face 94B and the housing second end 88B, and an outer cavity 87B defined between the piston head outer face 94A and the housing outer end 88A. The relative sizes of the outer cavity 87B and the inner cavity 87A are determined by the position of the piston head 94 as the actuator piston 90 moves within the housing interior 86.

The actuator piston 90 is adapted to move reciprocally within the housing interior 86 such that the piston head 94 either advances towards the housing outer end 88A or retracts towards the housing inner end 88B. When the actuator piston 90 advances towards the housing outer end 88A, the vanes 68 are opened which widens the variable inlets 76. When the actuator piston 90 retracts towards the housing second end 88B, the vanes 68 are closed, thus narrowing the variable inlets 76.

The actuator piston 90 is actuated by selectively directing the hydraulic fluid 112 to pressurize the inner cavity 87A or the outer cavity 87B. In a preferred embodiment, the hydraulic fluid 112 is oil. However, other types of fluids suitable for hydraulic actuation may be substituted, as will be apparent to a person of ordinary skill in the art in the field of the invention. Hydraulic pressure exerted by the hydraulic fluid 112 will cause the actuator piston 90 to advance when exerted against the piston head inner face 94B, or retract when directed against the piston head outer face 94A. The actuator piston 90 may advance at an advancing rate, and retract at a retracting rate. The first hydraulic transport line 98A and the second hydraulic transport line 98B are adapted to deliver the hydraulic fluid 112 to the outer cavity 87B and the inner cavity 87A respectively. The hydraulic fluid 112 is pressurized via the hydraulic fluid source 130, which may be an oil pump.

In another embodiment, the piston housing 84 has an inner hydraulic inlet 96A in fluid communication with the second hydraulic transport line 98B, and an outer hydraulic inlet 96B in fluid communication with the first hydraulic transport line 98A. In another embodiment, the actuator rod 92 is hollow to facilitate passage of the hydraulic fluid 112 and is in fluid communication with the outer hydraulic inlet 96B. The outer hydraulic inlet 96B may be disposed on the piston head 94, and allows the hydraulic fluid 112 to pass through the actuator rod 92 and the piston head outer face 94A and flow into the outer cavity 87B.

Returning to FIG. 1A while also referring to FIG. 2A, FIG. 3A, and FIG. 6, the reciprocating movement of the actuator piston 90 is controlled by the turbocharger control valve 10, which directs the hydraulic fluid 112 to the inner cavity 87A or the outer cavity 87B. In one embodiment, the turbocharger control valve 10 is positioned within a control valve chamber 36 located within the central housing 100 of the turbocharger 50. The turbocharger control valve 10 comprises a valve sleeve 12, a spool 21, an extended feedback cap 34, and a valve actuator 110. The valve sleeve 12 is an elongated tube with a sleeve first end 14A, a sleeve second end 14B, and sleeve wall 15A extending therebetween. The sleeve wall 15A has a sleeve inner surface 15B, a sleeve outer surface 15C, and a sleeve chamber 16 which is defined by the sleeve inner surface 15B. The sleeve 12 has a sleeve opening 18 positioned at the sleeve first end 14A which is transverse to the sleeve wall 15A and reveals the sleeve chamber 16. The sleeve opening 18 may be surrounded by a sleeve opening collar 18C which is formed by the sleeve wall 15A turning inwardly at the sleeve first end 14A such that the sleeve opening 18 has a diameter which is narrower than the diameter of the sleeve chamber 16. The sleeve 12 further has a first outlet 12A, a second outlet 12B, and a fluid inlet 13 positioned on the sleeve wall 15A. The first outlet 12A, the second outlet 12B, and the fluid inlet are formed as openings between the sleeve inner surface 15B and the sleeve outer surface 15C which provide access to the sleeve chamber 16. In one embodiment, the first outlet 12A is positioned between the sleeve first end 14A and the sleeve second end 14B, while the second outlet 12B is positioned between the first outlet 12A and the sleeve second end 14B. The fluid inlet 13 may be positioned between the first and second outlets 12A, 12B. The fluid inlet 13 is connected to a hydraulic input line 98C which carries the hydraulic fluid 112 to the turbocharger control valve 10 from the hydraulic fluid source 130.

The spool 21 is adapted to selectively allow or restrict fluid communication between the fluid inlet 13 and the first and second outlets 12A, 12B. The spool 21 has an elongated spool member 21M with a spool first end 21A and a distally oriented spool second end 21B. The spool 21 is positioned within the sleeve chamber 16 with the spool first end 21A oriented towards the sleeve first end 14A and the spool second end 21B oriented towards the sleeve second end 14B, allowing the spool 21 to axially advance or retract towards either the sleeve first end 14A or the sleeve second end 14B respectively. The spool 21 further has a first blocking portion 22A and a second blocking portion 22B which extend from the spool member 21M to contact the sleeve wall inner surface 15B, and a fluid channel 23 disposed between the first and second blocking portions 22A, 22B. In a preferred embodiment, the hydraulic fluid 112 enters the fluid channel 23 via the fluid inlet 13.

Turning to FIG. 3A, while also referring to FIG. 1A, the spool 21 is advanced or retracted by the valve actuator 110. In a preferred embodiment, the valve actuator 110 is positioned at the sleeve second end 14B, and may be a linear actuator such as a solenoid. The valve actuator 110 has a pushrod 20 which extends into the sleeve cavity to abut against the spool second end 21B. The valve actuator 110 is adapted to selectively push the pushrod 20 towards the sleeve first end 14A or pull the pushrod 20 away from the sleeve first end 14A. For example, the solenoid may pull the pushrod 20 using electromagnetic force when energized with electricity, while an internal return spring pushes the pushrod 20 in opposition to the electromagnetic force. The valve actuator 110 is connected to a control module 114 via a control circuit 116, allowing the control module 114 to control the valve actuator. The control module 114 is an automotive control unit integrated into the vehicle which controls engine performance. For example, the control module 114 may be a powertrain control module, or any other appropriate component of a vehicle control system.

Returning to FIG. 1A, the extended feedback cap 30 is positioned within the sleeve chamber 16 proximate to the sleeve first end 14A. In a preferred embodiment, the extended feedback cap 30 has a cap body 32 which is substantially cylindrical and which has a diameter which is wider than the sleeve opening 18. The cap body 32 has a body outer face 32A which is oriented towards the sleeve opening 18, and a body inner face 32B which is oriented towards the sleeve second end 14B. The extended feedback cap further has a feedback protrusion 34 which projects away from the body outer face 32A, and has a diameter which is narrower than the sleeve opening 18, allowing the feedback protrusion 34 to pass therethrough. In a preferred embodiment, the feedback protrusion 34 is substantially cylindrical and terminates in a protrusion tip 34T which can be blunt or rounded.

The feedback spring 24 is positioned within the sleeve chamber 16 between the extended feedback cap 30 and the spool first end 21A. In a preferred embodiment, the feedback spring 24 is a compression spring with a spring first end 24A and a spring second end 24B. The feedback spring 24 is positioned in-line with the spool 21, with the spring first end 24A abutting against the cap inner face 32B and the spring second end 24B abutting against the spool first end 21A.

The feedback spring 24 exerts a retracting force that pushes the spool 21 towards the sleeve second end 14B, while the pushrod 20 of the valve actuator 110 exerts an advancing force that pushes the spool 21 towards the sleeve first end 14B. The valve actuator 110 can proportionally increase or decrease the advancing force exerted by the pushrod in opposition to the retracting force exerted by the feedback spring 24, to produce a net force acting upon the spool 21. The net force places the spool 21 in one of a plurality of spool positions within the sleeve chamber 16.

Figure 7:
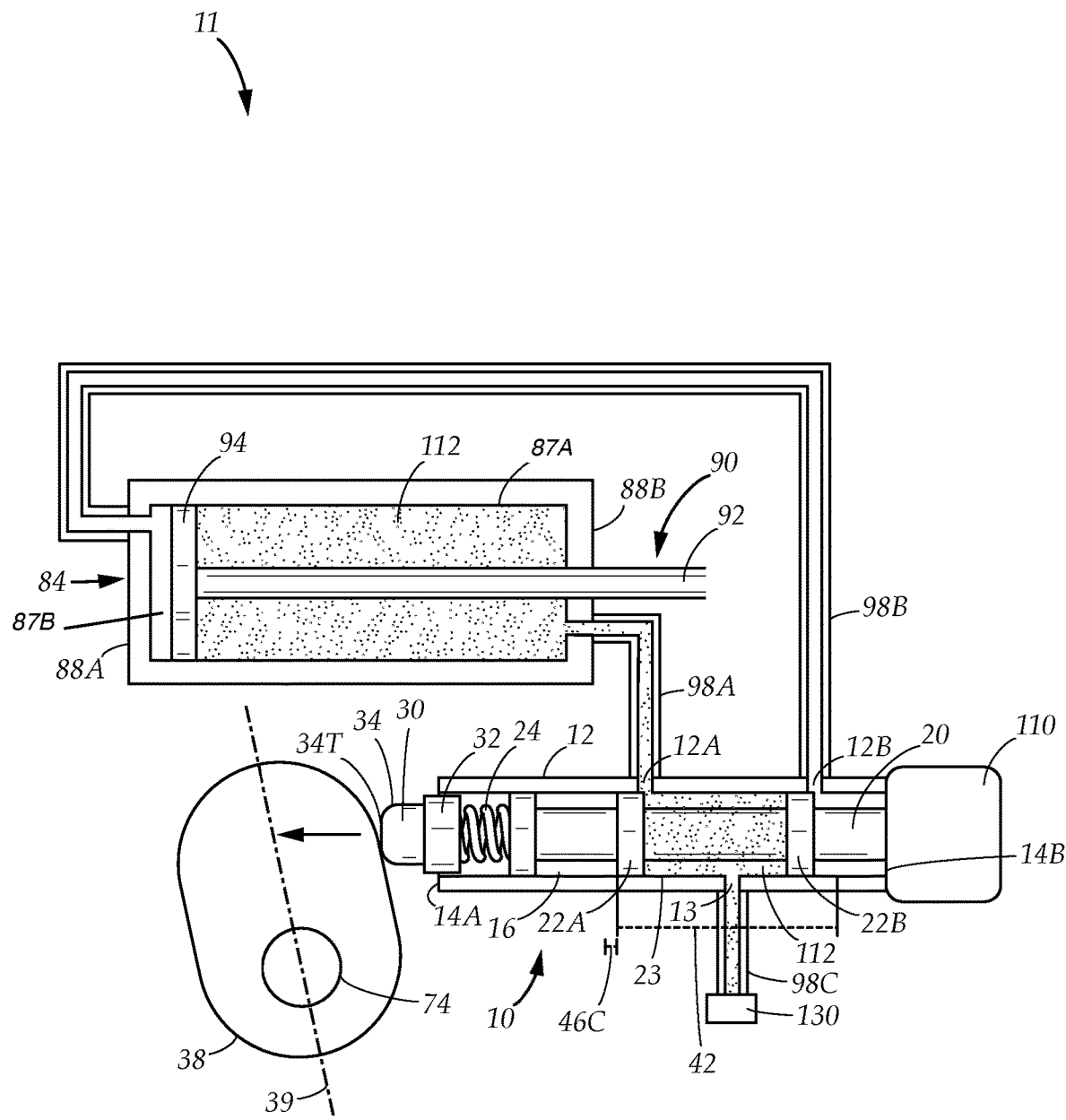
FIG. 7 is a diagrammatical side view of the hydraulic actuation assembly controlled by the turbocharger control valve with the extended feedback cap, further showing the spool in a fully advanced position, in accordance with an embodiment in the present disclosure.

Referring to FIGS. 3A-B while also referring to FIGS. 6-7, the hydraulic actuation assembly 11 further has a feedback mechanism which exerts a feedback force upon the extended feedback cap 30 which varies as the vanes 68 open and close. In a preferred embodiment, the feedback mechanism comprises a feedback cam 38 attached to the actuator rod 92 and the actuator lever 74. The feedback cam 38 has a cam tilt position 39 which reflects the positioning of the vanes 68 and the area of the variable inlets 76. In one embodiment, the cam tilt position 39 is adjusted towards the extended feedback cap 30 as the actuator piston 90 retracts, and is adjusted away from the extended feedback cap 30 as the actuator piston 90 advances. Tilting the feedback cam 38 towards the extended feedback cap 30 increases the feedback force, while tilting the feedback cam 38 away from the extended feedback cap 30 reduces the feedback force. The feedback cam 38 may be movably linked to the actuator rod 92 via a rack and pinion assembly, or other mechanism known in the art.

The feedback cam 38 is positioned in contact against the feedback protrusion 34 of the extended feedback cap 30, and the feedback force exerted by the feedback cam 38 pushes the extended feedback cap 30 towards the sleeve second end 14B, which in turn compresses the feedback spring 24. The retracting force exerted by the feedback spring 24 upon the spool 21 is proportional to the feedback force, and pushes the spool 21 towards the sleeve second end 14B. The control module 114 must therefore balance the advancing force exerted by the valve actuator 110 against the changes in the retracting force caused by the feedback force, in order to produce the correct net force which will place the spool 21 in the appropriate spool position.

Referring to FIG. 6 and FIG. 7 while also referring to FIG. 1A, the spool positions comprise a fully retracted position 40 in which the net force retracts the spool 21 maximally towards the sleeve second end 14B, a fully advanced position 42 in which the net force advances the spool 21 maximally towards the sleeve first end, and one or more intermediate positions in which the spool 21 is positioned therebetween. When the spool 21 is in the fully retracted position 40, the hydraulic fluid passes through the second outlet 12B and the second fluid transport line 96B to pressurize the outer cavity 87B of the piston housing 84, causing the actuator piston 90 to retract. When the spool 21 is in the fully advanced position 42, the hydraulic fluid 112 passes through the first outlet 12A and the first hydraulic transport line 96A to pressurize the inner cavity 87A of the piston housing 84, causing the actuator piston 90 to advance. Note that the fully advanced position 42 and the fully retracted position 40 reflect the positioning of the spool 21 when the extended feedback cap 30 is installed within the turbocharger control valve 10.

In a preferred embodiment, the spool 21 selectively reveals or blocks off the first and/or second outlets 12A, 12B. When the spool 21 is placed in the fully retracted position 40, the first blocking portion 22A, the fluid channel 23, and the second blocking portion 22B all move toward the sleeve second end 14B and away from the sleeve first end 14A. The first blocking portion 22A is positioned between the fluid channel 23 and the first outlet 12A, and prevents the hydraulic fluid 112 from reaching the first outlet. The second blocking portion 22B moves past the second outlet 12B towards the sleeve second end 14B, thus revealing the second outlet 12B to the fluid channel 23 and allowing the hydraulic fluid 112 to pressurize the outer cavity 87B of the piston housing 84.

When the spool 21 is placed in the fully advanced position 42, the first blocking portion 22A, the fluid channel 23, and the second blocking portion 22B all move towards the sleeve first end 14A and away from the sleeve second end 14B. The second blocking portion 22B moves past the second outlet 12B towards the sleeve first end 14A and is thus positioned between the fluid channel 23 and the second outlet 12B, preventing the hydraulic fluid 112 from reaching the second outlet 12B. The first blocking portion 22A moves past the first outlet 12A towards the sleeve first end 14A, thus revealing the first outlet 12A to the fluid channel 23 and allowing the hydraulic fluid 112 to pressurize the inner cavity 87A of the piston housing 84.

Note that when either the inner cavity 87A or the outer cavity 87B is pressurized, the opposite cavity is vented and the hydraulic fluid 112 is expelled through either the first or second hydraulic transport line 98A, 98B as appropriate The vented hydraulic fluid 112 may be returned to the hydraulic fluid source 130 via a return transport line for re-use. In one embodiment, the spool 21 may have venting channels positioned between the first blocking portion 22A and the spool first end 21A, and between the second blocking portion 22B and the spool second end 21B. When the spool 21 advances or retracts, one of the venting spaces may be revealed or otherwise placed in fluid communication with the first or second inlet 12A, 12B. The hydraulic fluid 112 which enters the venting channels may then be directed through the return transport lines.

Referring to FIG. 6, in an example when the spool 21 is placed in the fully retracted position 40, the second inlet 12B is placed in fluid communication with the fluid channel 23 and the outer cavity 87B is pressurized. As the actuator piston 90 retracts, the hydraulic fluid 112 within the inner cavity 87A is pushed by the piston head 94 back through the first hydraulic transport line 96A to be vented through the venting space.

Figure 8:
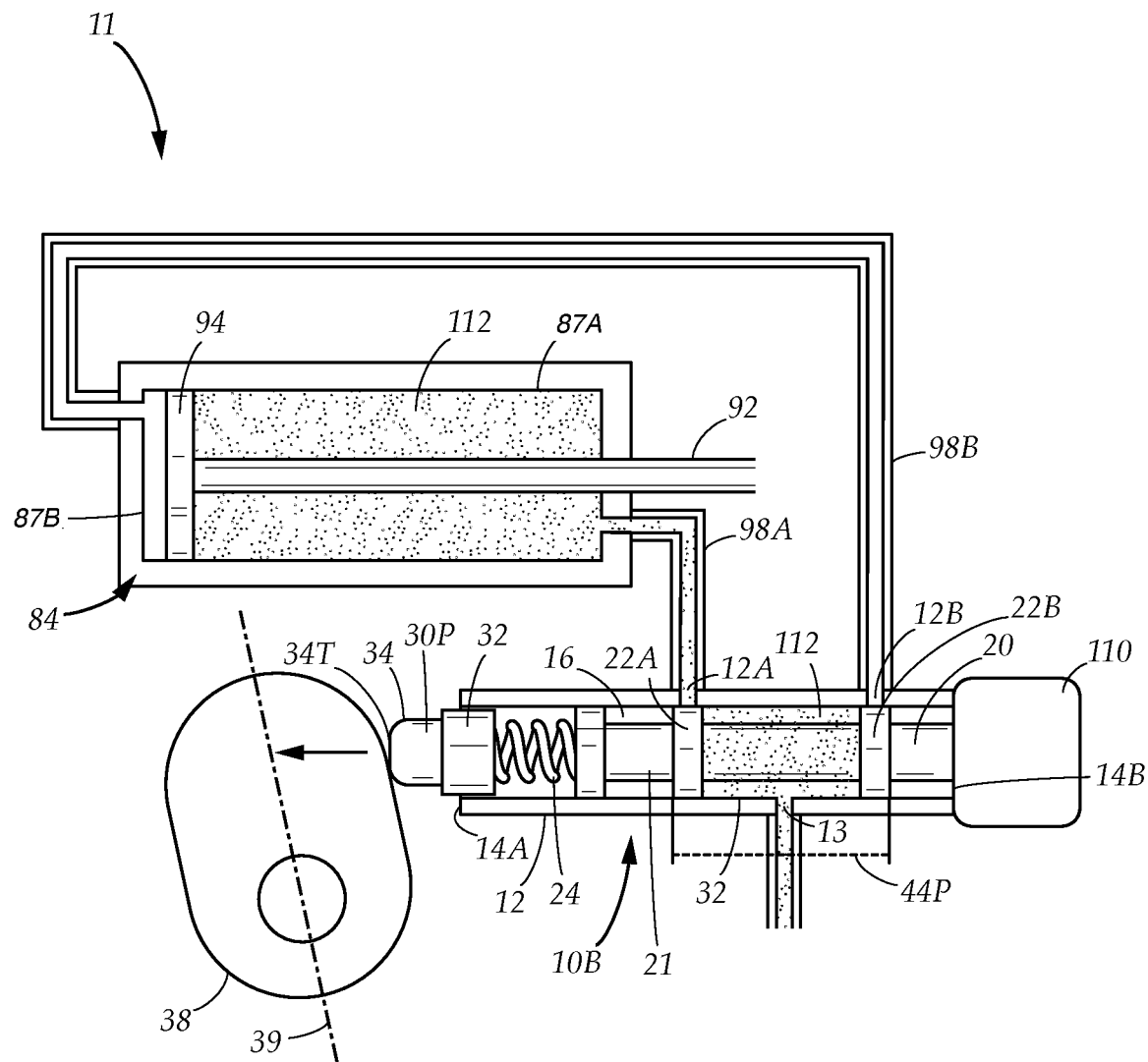
FIG. 8 is a diagrammatical side view of the hydraulic actuation assembly controlled by the conventional turbocharger control valve, showing the spool in a stock holding position, in accordance with an embodiment in the present disclosure.
Figure 9:
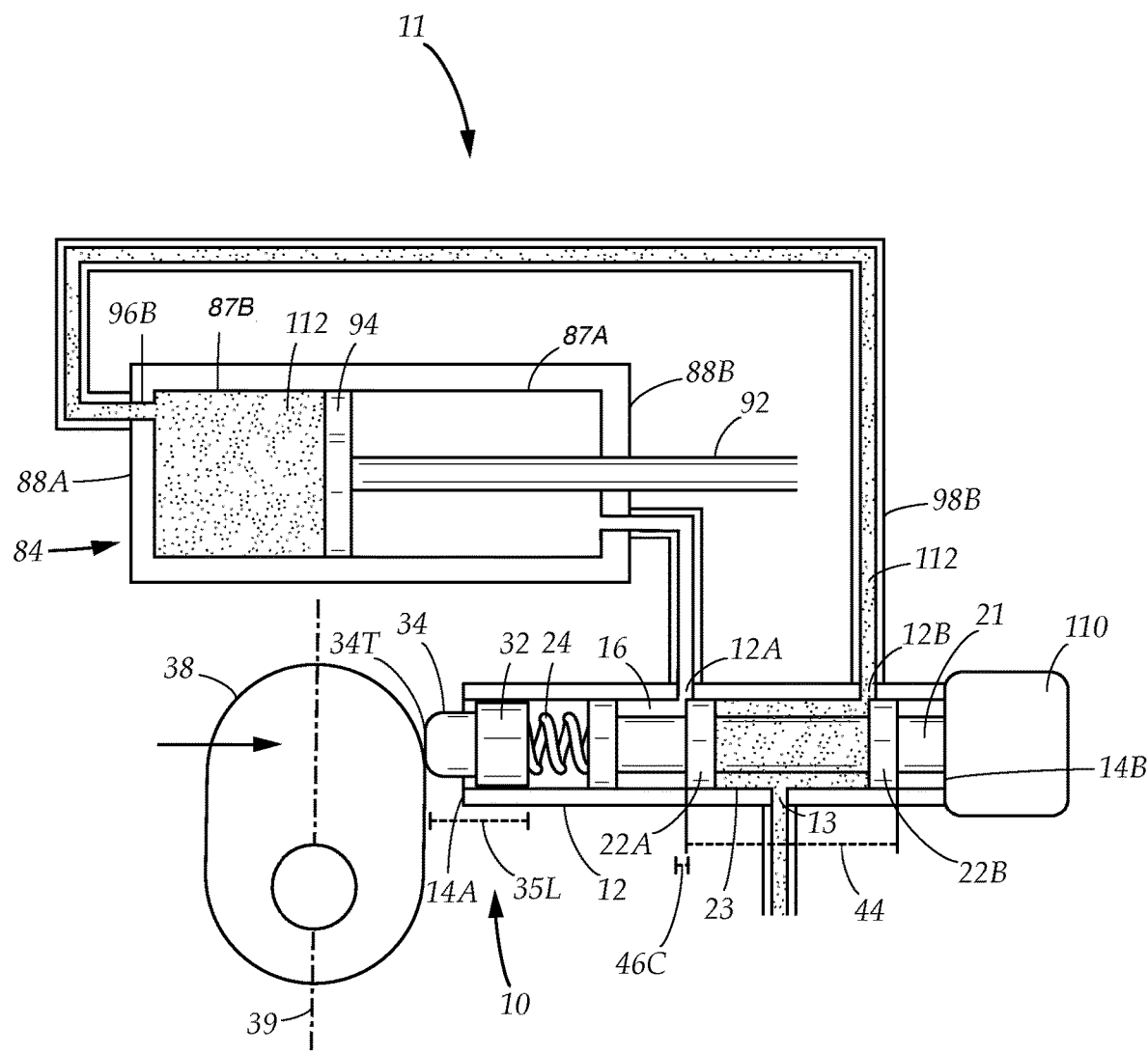
FIG. 9 is a diagrammatical side view of the hydraulic actuation assembly controlled by the turbocharger control valve with the extended feedback cap, further showing the spool in an offset holding position, in accordance with an embodiment in the present disclosure.

Referring to FIGS. 8-9 while also referring to FIGS. 2A-B and FIGS. 3A-B, in conventional operation of the turbocharger 50, the vanes 68 may be fixed in place to prevent further change to the area of the variable inlets 76. For example, when the engine is operating at high engine speed and the variable inlets 76 are in the fully open position, the control module 114 may be programmed to prevent the vanes 68 from closing without continually pumping hydraulic fluid 112 to the interior cavity 87A. When the conventional turbocharger control valve 10B with the stock feedback cap 30P is used to control the hydraulic actuation assembly 11, the spool 21 is placed in a stock holding position 44P whereby the first and second outlets 12A, 12B are both blocked by the first and second blocking portions 22A, 22B. The stock holding position 44P prevents both the inner and outer cavities 87A, 87B from being vented, and holds the actuator piston 90 in place.

When the amount of boost pressure delivered by the turbocharger 50 is determined to be optimal for the current engine speed and the load placed upon the engine, the control module 114 may place the spool 21 in the stock holding position 44P to fix the variable inlets 76 in place to maintain the optimal boost pressure. However, a decrease in engine speed while the variable inlets 76 are fixed would cause a reduction in the volume of exhaust gas flowing into the exhaust chamber 56, further resulting in a drop in back pressure. The boost pressure produced by the turbocharger 50 will decrease, as the area of the variable inlets 76 will be too large to allow the exhaust gas to effectively drive the turbine wheel 64. Although the control module 114 will eventually cause the vanes 68 to close and reduce the area of the variable inlets 76, the command module 114 will be slow to respond without adjustments being made to the behavior of the control module 114. Use of the extended feedback cap 30 mitigates the undesirable loss of back pressure and boost pressure which occurs after the variable inlets 76 are fixed in place during conventional operation.

Referring to FIGS. 1A-B, FIGS. 2A-B, FIG. 3A, and FIGS. 6-7, installation of the extended feedback cap 30 requires no alterations to the valve sleeve 12 or any other component of the turbocharger control valve 10. A conventional turbocharger control valve 10B is transformed into a turbocharger control valve 10 by simply removing the stock feedback cap 30 from the valve sleeve 12, installing the extended feedback cap 30P, reassembling the turbocharger control valve 10, and installing the turbocharger control valve 10 within the control valve chamber 36 of the turbocharger 50.

The extended feedback cap 30 differs from the stock feedback cap 30P, in that the extended feedback cap 30 has an overall cap length 35L which is greater than the cap length 35L of the stock feedback cap 30P. The feedback protrusion 34 of the extended feedback cap has a cap protrusion length 34L which is longer than the cap protrusion length 34L of the feedback protrusion 34 of the stock feedback cap 30P. The feedback protrusion 34 of the extended feedback cap 30 therefore extends further beyond the sleeve opening 18 than the feedback protrusion 34 of the stock feedback cap 30P. When the feedback cam 38 pushes against the feedback protrusion 34, the feedback force upon the spool 21 is effectively increased independently of the cam tilt position 39, as the maximum distance by which the spool 21 is pushed towards the sleeve second end 14B is increased by the length differential between the cap protrusion lengths 34L of the extended feedback cap 30 and the stock feedback cap 30P.

The advancing force exerted by the valve actuator 110 remains calibrated against the stock feedback force exerted against the stock feedback cap 30P, and the control module 114, which remains unmodified, does not compensate for the increased feedback force. Therefore, the resulting net force displaces the spool 21 towards the sleeve second end 14B by an offset distance 46C.

Referring to FIGS. 8 and 9 while also referring to FIGS. 2A-B and FIGS. 3A-B, when the extended feedback cap 30 in use and the control module 114 attempts to fix the vanes 68 in position, the spool 21 is placed in the offset holding position 44 instead of the stock holding position 44P. The increased feedback force causes the spool 21 to be pushed past the stock holding position 44P towards the sleeve second 14B, by an additional distance equal to the offset distance 46C. In contrast to the stock holding position 44P in which the first and second outlets 12A, 12B are blocked by the first and second blocking portions 22A, 22B, the offset holding position 44 displaces the second block portion 22B sufficiently towards the sleeve second end 14B that the second inlet 12B is partially revealed to the fluid channel 23. This allows the hydraulic fluid 112 to flow into the outer cavity 87B of the piston housing 84. The first inlet 12A remains cut off from the fluid channel 23, but is also partially revealed to the venting channel located proximate to the first blocking portion 22A. The offset holding position 44 thus causes a limited hydraulic flow to enter the outer cavity 87B while also allowing the inner cavity 87A to be vented. The limited hydraulic flow causes the actuator piston 90 to retract at a reduced retracting rate which is slower than the retracting rate, and further reduces the area of the variable inlets 76 by causing the vanes 68 to partially close. The retraction of the actuator piston 90 and the resulting closing of the vanes 68 is therefore not the result of a command by the control module 114 to retract the spool 21, but is instead caused by the lengthening of the cap length 35L and the resulting displacement of the spool 21.

In the example illustrated, after a period of engine operation at high engine speed, the increased volume of exhaust gas entering the exhaust chamber 56 causes the control module 114 to command that the vanes 68 be fully opened to widen the variable inlets 76. The spool 21 is placed in the offset holding position 44 after the vanes 68 are fully opened, thus triggering the limited flow of hydraulic fluid 112 which causes the actuator piston 90 to retract at the reduced retracting rate and partially close the vanes 68. Shortly after the spool 21 is placed in the offset holding position 44, the engine begins to operate at a low engine speed, causing a large reduction in the volume of the exhaust gas entering the exhaust chamber 56. However, as the actuator piston 90 has already begun to retract and the area of the variable inlets 76 has already been reduced, the loss of back pressure and the reduction of boost pressure is preemptively mitigated without waiting for the control module 114 to detect and compensate for a reduction in engine performance. In a situation where the engine speed increases after the spool 21 is placed in the offset holding position 44, the control module 114 will still be able to command the vanes 68 to open to prevent an excessive buildup of exhaust pressure.

Furthermore, in certain embodiments, as the actuator piston 90 retracts towards the housing inner end 88B, the cam tilt position 39 is adjusted towards the extended feedback cap 30, causing the feedback force exerted by the feedback cam 38 to increase. The increase in the feedback force may displace the spool 21 past the offset holding position 44 towards the sleeve second end 14B, thus increasing the flow of hydraulic fluid 112 through the second outlet 12B and accelerating the closing of the vanes 68. Once the limited hydraulic flow to the outer cavity 87B is initiated, the feedback force may therefore trigger a gradual increase in the reduced retracting rate which in turn increases the retention of back pressure and boost pressure.

Returning to FIGS. 1A-B, in an embodiment, the cap body 32 of the extended feedback cap 30 has a cap body length 32L which exceeds the cap body length 32L of the stock feedback cap 30P. The cap body length 32L may be measured between the body outer face 32A and the body inner face 32B. The overall cap length 35L of the extended feedback cap 30 may therefore be increased by extending the cap body length 32L or the cap protrusion length 34L individually or in combination. In certain embodiments, it may be desirable to increase the cap body length 32L without increasing the cap protrusion length 34L.

Referring to FIGS. 1A-B, FIG. 1A depicts the spool 21 in a offset resting position 46P in which the feedback force is absent and the body outer face 32A of the extended feedback cap 30 abuts against the sleeve opening collar 18C. Due to the increased cap body length 32L, the distance between the body inner face 32B of the extended feedback cap 30 and the sleeve second end 14B is shorter than the distance between the body inner face 32B of the stock feedback cap 30 and the sleeve second end 14B. The extended feedback cap 30 therefore compresses the feedback spring 24 to a greater extent than the stock feedback cap 30P, resulting in the feedback spring 24 exerting an increased resting retracting force upon the spool 21 even when the feedback force is absent. Comparing the offset resting position 46 with the stock resting position 46P of the spool when the stock feedback cap 30P is used, the spool 21 is displaced towards the sleeve second end 14B which further increases the offset distance 46C.

Figure 5:
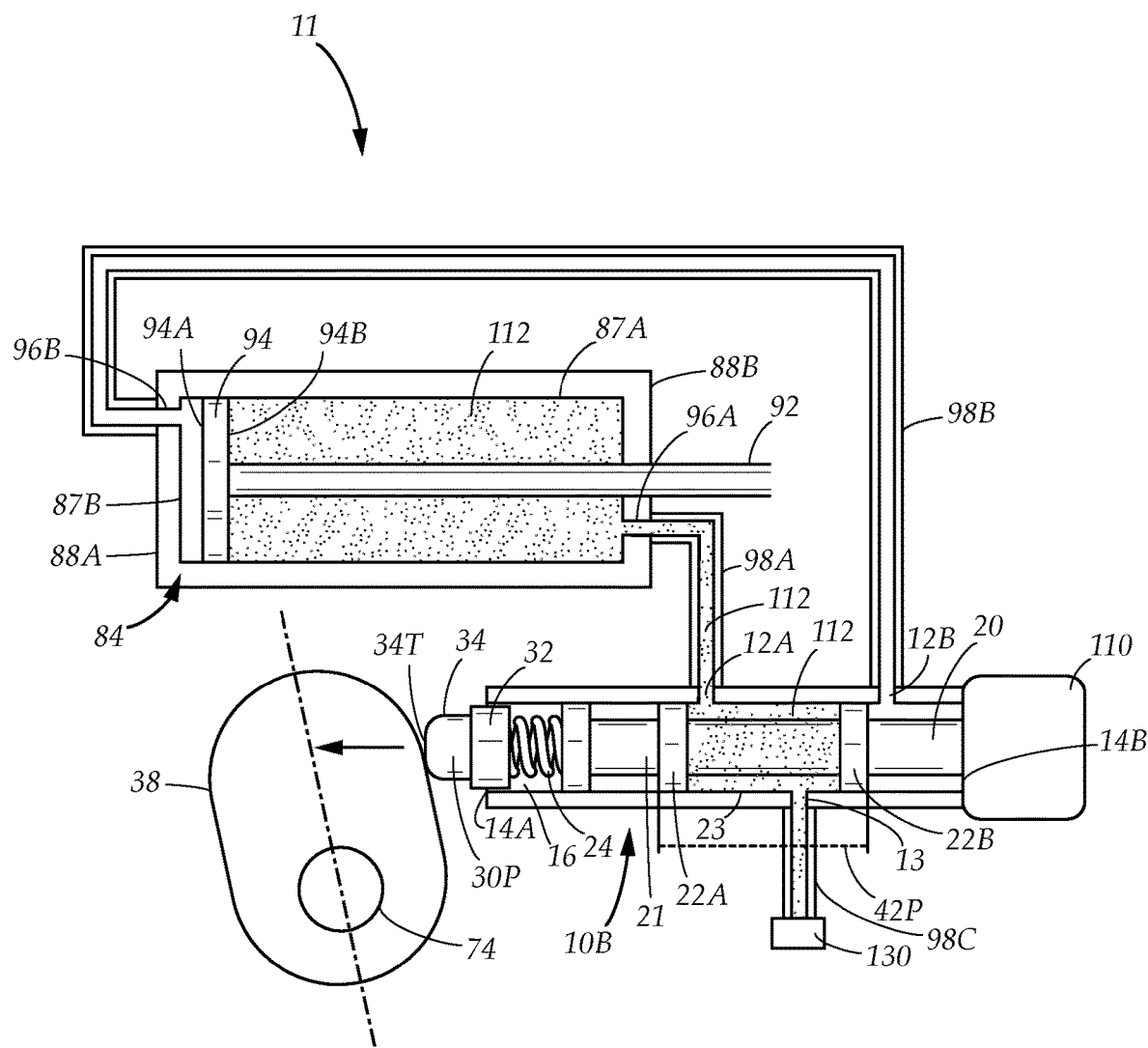
FIG. 5 is a diagrammatical side view of the hydraulic actuation assembly controlled by the conventional turbocharger control valve, further showing the spool in a stock fully advanced position which hydraulically advances the piston, in accordance with an embodiment in the present disclosure.

Referring to FIGS. 4 and 5 while also referring to FIGS. 1A-B, FIG. 3A,B and FIGS. 6 and 7, increasing the offset distance 46C, such as by extending the cap body length 32L, may further affect the reciprocal movement of the actuator piston 90 by slowing the advancing rate compared to the retracting rate.

When the stock feedback cap 30P is employed, the actuator piston 90 is retracted or advanced by placing the spool in a stock fully retracted position 40P or a stock fully advanced position 42P respectively. When the spool 21 is placed in the stock fully advanced position 42P, the first outlet 12A is fully exposed and in fluid communication with the fluid channel 23. The advancing rate and the retracting rate may be nearly equal when the stock feedback cap 30P is employed.

However, when the extended feedback cap 30 is employed and the spool 21 is placed in the fully advanced position 42, the spool 21 is displaced towards the sleeve second end 14B by an interval equal to the offset distance 46C. Where the offset distance 46C is sufficiently large, the additional displacement of the offset distance 46C causes the first blocking portion 22A to partially block the first outlet 12A, and reduce the flow of hydraulic fluid 112 to the inner cavity 87A. However, the second outlet 12B remains unblocked when the spool 21 is placed in the fully retracted position 40, allowing the hydraulic fluid 112 to flow through the second outlet 12B unimpeded. The inner cavity 87A is therefore pressurized more slowly than the outer cavity 87B, thus slowing the advancing rate in relation to the retracting rate. Slowing the advancing rate correspondingly delays the opening of the vanes 68 in response to an increased volume of exhaust gas, thus causing greater retention of back pressure by limiting the escape of the exhaust gas through the variable inlets 76.

Referring to FIGS. 1A-B, FIGS. 2A-B, and FIGS. 8-9 the precise dimensions of the extended feedback cap 30 will vary according to the characteristics and requirements of the turbocharger control valve 10, the turbocharger 50, and the engine. For example, the cap length 35L may only need to be increased over the stock feedback cap 30 by several millimeters in order to displace the spool 21 sufficiently to partially reveal the second outlet 12B to implement the offset holding position 44. Therefore, a person of ordinary skill in the art of the field of the invention will be able to determine the appropriate offset distance 46C needed to achieve the features described herein, as well as the degree of change in the cap length 35L required to displace the spool 21 by the offset distance 46C.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a turbocharger control valve for retaining back pressure and maintaining boost pressure. The disclosure is illustrated by example in the drawing figures, and throughout the written description. It should be understood that numerous variations are possible, while adhering to the inventive concept. Such variations are contemplated as being a part of the present disclosure.

What is claimed is:

1. A turbocharger control valve for a variable geometry turbocharger adapted for use with an internal combustion engine, the engine having a combustion chamber, an air intake, and an exhaust port, the turbocharger comprising a turbine assembly having a turbine wheel adapted to rotate when exposed to a flow of exhaust gas exiting the exhaust port of the engine, and a compressor rotatably linked to the turbine wheel and adapted to rotate in unison with the turbine wheel to force compressed air to the combustion chamber of the engine via the air intake, the turbocharger further comprising a variable inlet interposed between the flow of exhaust gas and the turbine wheel, the variable inlet having an area and is adapted to actuate between an open position where the area is at its greatest and a closed position where the area is at its smallest, the turbocharger further comprising a hydraulic actuation assembly adapted to actuate the variable inlet between the closed and open positions, the hydraulic actuation assembly comprising an actuator housing, an actuator piston adapted to move within the actuator housing by advancing or retracting, the actuator piston further having a piston head which divides the actuator housing between an interior cavity and an exterior cavity, and a piston rod which actuates the variable inlet, the hydraulic actuation assembly further having a feedback mechanism for exerting a feedback force linked to the movement of the actuator piston, a hydraulic fluid source adapted to deliver a hydraulic fluid under pressure, a first hydraulic transport line adapted to advance the actuator piston and open the variable inlet by delivering the hydraulic fluid to the inner cavity, and a second hydraulic transport line adapted to retract the actuator and close the variable inlet by delivering the hydraulic fluid to the outer cavity, the turbocharger is adapted to increase boost pressure of the compressed air by directing the flow of exhaust gas through the variable inlet in the closed position to speed up the flow of the exhaust gas contacting the turbine wheel at low engine speeds, and limit the boost pressure by actuating the variable inlet towards the open position as the pressure of the exhaust gas increases at high engine speeds, the turbocharger control valve comprising:

a tubular valve sleeve having a sleeve first end, a sleeve second end, and a sleeve wall extending therebetween, the valve sleeve further having a sleeve chamber disposed within the sleeve wall, a sleeve opening disposed at the sleeve first end, a first outlet, a second outlet, and a fluid inlet formed as openings on the sleeve wall, the first outlet is in fluid communication with the first hydraulic transport line, the second outlet is in fluid communication with the second hydraulic transport line, and the fluid inlet is in fluid communication with the hydraulic fuel source;

an elongated spool positioned axially within the sleeve chamber, the spool having a spool first end oriented towards the sleeve first end, spool second end oriented towards the sleeve second end, and a fluid channel adapted to selectively permit or restrict the flow of the hydraulic fluid from the fluid inlet to the first and second outlets;

an extended feedback cap having a cap body and a feedback protrusion projecting therefrom, the extended feedback cap is positioned at the sleeve first end with the feedback protrusion projecting outwardly through the sleeve opening and the cap body positioned within the sleeve chamber, the feedback protrusion is adapted to abut against the feedback mechanism such that the extended feedback cap is pushed inwardly towards the sleeve second end by the feedback force;

a feedback spring positioned within the sleeve chamber between the extended feedback cap and the spool first end, the feedback spring exerts a retracting force against the spool which pushes the spool towards the sleeve second end, whereby the retracting force is proportional in magnitude to the feedback force exerted by the feedback mechanism upon the extended feedback cap; and a valve actuator disposed at the sleeve second end, the valve actuator is adapted to exert an advancing force against the spool which pushes the spool towards the sleeve first end, the valve actuator is further adapted to proportionally adjust the advancing force to overcome the retracting force and produce a net force which advances or retracts the spool to place the spool in one of a plurality of spool positions, the spool positions comprising a fully advanced position which causes the hydraulic fluid to flow from the fluid channel through the first outlet to advance the actuator piston and open the variable inlet, a fully retracted position which causes the hydraulic fluid to flow from the fluid channel through the second outlet to retract the actuator piston at a retracting rate and close the variable inlet, and an offset holding position which partially restricts the second outlet to allow a limited hydraulic flow to pass therethrough to the outer cavity, the limited hydraulic flow causes the actuator piston to retract at a reduced retracting rate and partially close the variable inlet.

2. The turbocharger control valve as described in claim 1, wherein:

the spool has a first blocking portion positioned between the spool first end and the fluid channel, and a second blocking portion positioned between the spool second end and the fluid channel, the first blocking portion blocks the first outlet when the spool is placed in the fully retracted position and in the offset holding position, the second blocking portion blocks the second outlet when the spool is placed in the fully advanced position, the second blocking portion further partially blocks the second outlet when the spool is placed in the offset holding position to allow the limited hydraulic flow to pass through the second outlet.

3. The turbocharger control valve as described in claim 2, wherein:

the first blocking portion partially blocks the first outlet when the spool is placed in the fully advanced position, thus causing the actuator piston to advance at an advancing rate which is slower in comparison to a retracting rate at which the actuator piston retracts when the spool is placed in the fully retracted position.

4. A modification kit for a variable geometry turbocharger adapted for use with an internal combustion engine, the engine having a combustion chamber, the turbocharger has a turbine and a compressor, and is adapted to increase engine performance by using the turbine to harness a flow of exhaust gas produced by the engine to drive the compressor, the exhaust gas has a volume proportional to an engine speed, the turbocharger further has a variable inlet interposed between the flow of exhaust gas and the compressor, the variable inlet having an area and is adapted to actuate between an open position where the area is at its greatest and a closed position where the area is at its smallest, the compressor forces a volume of compressed air to the combustion chamber to create boost pressure, the turbocharger is adapted to increase the boost pressure by reducing the area of the variable inlet when the engine speed is low, and maintain the boost pressure by increasing the area of the variable inlet when the engine speed is high to prevent a buildup of exhaust gas within the turbine, the turbocharger further having a hydraulic actuator assembly comprising a turbocharger control valve, an actuator piston within a piston housing, a feedback mechanism linked to the actuator piston, a first hydraulic transport line, a second hydraulic transport line, a hydraulic fluid source adapted to propel a hydraulic fluid under pressure, and a control module, the actuator piston is adapted to actuate the variable inlet towards the open position by advancing the piston within the piston housing, and actuate the variable inlet towards the closed position by retracting the piston within the piston housing, the turbocharger control valve comprises a tubular valve sleeve with a first sleeve end, a second sleeve end, a sleeve chamber, a sleeve first outlet positioned between the sleeve first and second ends in fluid communication with the first hydraulic transport line, a sleeve second outlet positioned between the first outlet and the sleeve second end in fluid communication with the second hydraulic transport line, and a fluid inlet in fluid communication with the hydraulic fluid source, the turbocharger control valve further comprises an elongated spool axially disposed with the sleeve chamber which is adapted to advance towards the sleeve first end or retract towards the sleeve second end, the spool has a fluid channel adapted to selectively facilitate or restrict the hydraulic fluid from flowing from the fluid inlet to the first outlet and the second outlet, the turbocharger control valve further comprising a stock feedback cap having a stock feedback protrusion which extends outwardly through the sleeve opening at the sleeve first end to abut against the feedback mechanism, a feedback spring positioned between the spool and the stock feedback cap which exerts a retracting force pushing the spool towards the sleeve second end, and a valve actuator disposed proximate to the sleeve second end adapted to exert a variable advancing force which pushes the spool towards the sleeve first end, wherein the feedback mechanism exerts a feedback force against the stock feedback protrusion which pushes the stock feedback cap inwardly towards the feedback spring, such that the feedback force increases the retracting force, the valve actuator is adapted to receive control signals from the control module causing the valve actuator to increase or decrease the advancing force to offset the retracting force and produce a net force which advances or retracts the spool to place the spool in one of a plurality of spool positions, the spool positions comprising a stock fully advanced position which causes the hydraulic fluid to flow from the fluid channel through the first outlet to advance the piston at an advancing rate and open the variable inlet, a stock fully retracted position which causes the hydraulic fluid to flow from the fluid channel through the second outlet to retract the piston at a retracting rate and close the variable inlet, and a holding position which causes the spool to block the first outlet and the second outlet to prevent the actuator piston from moving and hold the variable inlet in place, the modification kit comprising:

an extended feedback cap having a cap body and a feedback protrusion projecting from the cap body, the feedback protrusion having a protrusion length which exceeds a length of the stock feedback protrusion resulting in a length differential, the extended feedback cap is adapted to be installed within the turbocharger control valve to replace the stock feedback valve, such that the feedback protrusion extends forwardly through the sleeve opening to abut against the feedback mechanism while the cap body abuts the feedback spring, the extended feedback cap is adapted to be pushed inwardly towards the feedback spring by the feedback mechanism, and the length differential caused by the protrusion length increases the feedback force exerted by the feedback spring, further increasing the retracting force exerted upon the spool by the feedback spring, whereby the increased retracting force offsets the advancing force of the valve actuator and displaces the spool in each of the spool positions towards the sleeve second end by a displacement distance, resulting in the spool being positioned in an offset holding position instead of the stock holding position, the offset holding position prevents the hydraulic fluid from flowing through the first outlet but causes a limited hydraulic flow to pass through the second outlet, causing the actuator piston to retract at a reduced retracting rate and partially close the variable inlet, the offset holding position causing an increased retention of exhaust pressure within the turbine.

5. The modification kit as described in claim 4, wherein:
the spool has a spool first end oriented towards the sleeve first end, a spool second end oriented towards the sleeve second end, the fluid channel is positioned between the spool first and second ends, the spool further having a first blocking portion positioned between the spool first end and the fluid channel and a second blocking portion positioned between the fluid channel and the spool second end; and
wherein the offset distance causes the first blocking portion to fully block the first outlet when the spool is placed in the offset holding position while partially blocking the second outlet to allow the limited hydraulic flow; and
wherein the offset holding position preemptively mitigates the loss of boost pressure following a reduction in the volume of the exhaust gas entering the turbine without the valve actuator being commanded to retract the spool by the control module.

6. The modification kit as described in claim 5, wherein:
the increased retracting force displaces the spool towards the sleeve second end by the offset distance when the valve actuator is commanded to place the spool in the stock fully advanced position, causing the first blocking portion to partially restrict the first outlet and partially restrict the hydraulic fluid flowing through the first outlet, further resulting in the advancing rate of the actuator piston being slower than the retracting rate, whereby the slower advancing rate delays the increase in the area of the variable inlet and increases the buildup of the exhaust gas in the turbine.

7. A method for improving performance of a turbocharger adapted for use with an internal combustion engine, the engine having a combustion chamber, the turbocharger has a turbine and a compressor, and is adapted to increase engine performance by using the turbine to harness a flow of exhaust gas produced by the engine to drive the compressor, the exhaust gas has a volume proportional to an engine speed, the turbocharger further has a variable inlet interposed between the flow of exhaust gas and the compressor, the variable inlet having an area and is adapted to actuate between an open position where the area is at its greatest and a closed position where the area is at its smallest, the compressor forces a volume of compressed air to the combustion chamber to create boost pressure, the turbocharger is adapted to increase the boost pressure by reducing the area of the variable inlet when the engine speed is low, and maintain the boost pressure by increasing the area of the variable inlet when the engine speed is high to prevent a buildup of exhaust gas within the turbine, the turbocharger further having a hydraulic actuator assembly comprising a turbocharger control valve, an actuator piston within a piston housing, a feedback mechanism linked to the actuator piston, a first hydraulic transport line, a second hydraulic transport line, a hydraulic fluid source adapted to propel a hydraulic fluid under pressure, and a control module, the actuator piston is adapted to actuate the variable inlet towards the open position by advancing the piston within the piston housing, and actuate the variable inlet towards the closed position by retracting the piston within the piston housing, the turbocharger control valve comprises a tubular valve sleeve with a first sleeve end, a second sleeve end, a sleeve chamber, a sleeve first outlet positioned between the sleeve first and second ends in fluid communication with the first hydraulic transport line, a sleeve second outlet positioned between the first outlet and the sleeve second end in fluid communication with the second hydraulic transport line, and a fluid inlet in fluid communication with the hydraulic fluid source, the turbocharger control valve further comprises an elongated spool axially disposed with the sleeve chamber which is adapted to advance towards the sleeve first end or retract towards the sleeve second end, the spool has a fluid channel adapted to selectively facilitate or restrict the hydraulic fluid from flowing from the fluid inlet to the first outlet and the second outlet, the turbocharger control valve further comprising a stock feedback cap having a stock feedback protrusion which extends outwardly through the sleeve opening at the sleeve first end to abut against the feedback mechanism, a feedback spring positioned between the spool and the stock feedback cap which exerts a retracting force pushing the spool towards the sleeve second end, and a valve actuator disposed proximate to the sleeve second end adapted to exert a variable advancing force which pushes the spool towards the sleeve first end, wherein the feedback mechanism exerts a feedback force against the stock feedback protrusion which pushes the stock feedback cap inwardly towards the feedback spring, such that the feedback force increases the retracting force, the valve actuator is adapted to receive control signals from the control module causing the valve actuator to increase or decrease the advancing force to offset the retracting force and produce a net force which advances or retracts the spool to place the spool in one of a plurality of spool positions, the spool positions comprising a stock fully advanced position which causes the hydraulic fluid to flow from the fluid channel through the first outlet to advance the piston at an advancing rate and open the variable inlet, a stock fully retracted position which causes the hydraulic fluid to flow from the fluid channel through the second outlet to retract the piston at a retracting rate and close the variable inlet, and a holding position which causes the spool to block the first outlet and the second outlet to prevent the actuator piston from moving and hold the variable inlet in place, the method comprising the steps of:

providing an extended feedback cap having a cap body and a feedback protrusion, the feedback protrusion having a protrusion length greater than a length of the stock feedback protrusion;

replacing the stock feedback cap and installing the extended feedback cap in the valve sleeve of the turbocharger control valve, projecting the feedback protrusion forwardly through the sleeve opening, and abutting the cap body against the feedback spring;

receiving the feedback force exerted by the feedback mechanism upon the feedback protrusion, and pushing the extended feedback cap inwardly towards the feedback spring;

increasing the retracting force exerted by the feedback spring upon the spool and offsetting the advancing force exerted upon the spool by the valve actuator;

the control module commanding the valve actuator to position the spool in the stock holding position;

displacing the spool in the stocking holding position towards the sleeve second end by an offset distance to place the spool in an offset holding position instead, preventing the hydraulic fluid from flowing through the first outlet, and causing a limited hydraulic flow to pass through the second outlet and the second hydraulic transport line; and retracting the actuator piston at a reduced retracting rate and partially closing the variable inlet, and increasing retention of exhaust gas within the turbine.

8. The method as recited in claim 7, wherein:

the spool has a spool first end oriented towards the sleeve first end, a spool second end oriented towards the sleeve second end, the fluid channel is positioned between the spool first and second ends, the spool further having a first blocking portion positioned between the spool first end and the fluid channel and a second blocking portion positioned between the fluid channel and the spool second end;

the step of displacing the spool in the stock holding position further comprises the first blocking portion blocking the first outlet, and the second blocking position partially revealing the second outlet and allowing the limited hydraulic flow to pass through the second outlet; and the step of retracting the actuator piston at a reduced retracting rate further comprises preemptively mitigating the loss of boost pressure following a reduction in the volume of the exhaust gas entering the turbine without the valve actuator being commanded by the control module to retract the spool.

9. The method as recited in claim 8, wherein:

the step of retracting the actuator piston is followed by the steps of:

the control module commanding the valve actuator to place the spool in the stock fully advanced position;

displacing the spool in the stock fully advanced position towards the sleeve second end by the offset distance, partially restricting the first outlet with the first blocking portion, reducing the hydraulic fluid flowing through the first hydraulic transport line and reducing the advancing rate; and advancing the actuator piston at the reduced advancing rate and delaying the increase in the area of the variable inlet, and increasing the buildup of the exhaust gas in the turbine.

\* \* \* \* \*